3,403,458
GRAPHICAL CHART DISPLAY DEVICES AND SYSTEM
Stanley Mendell, Haddonfield, N.J., assignor to Planalog, Inc., a corporation of New Jersey
Filed Aug. 11, 1966, Ser. No. 571,748
17 Claims. (Cl. 35—24)

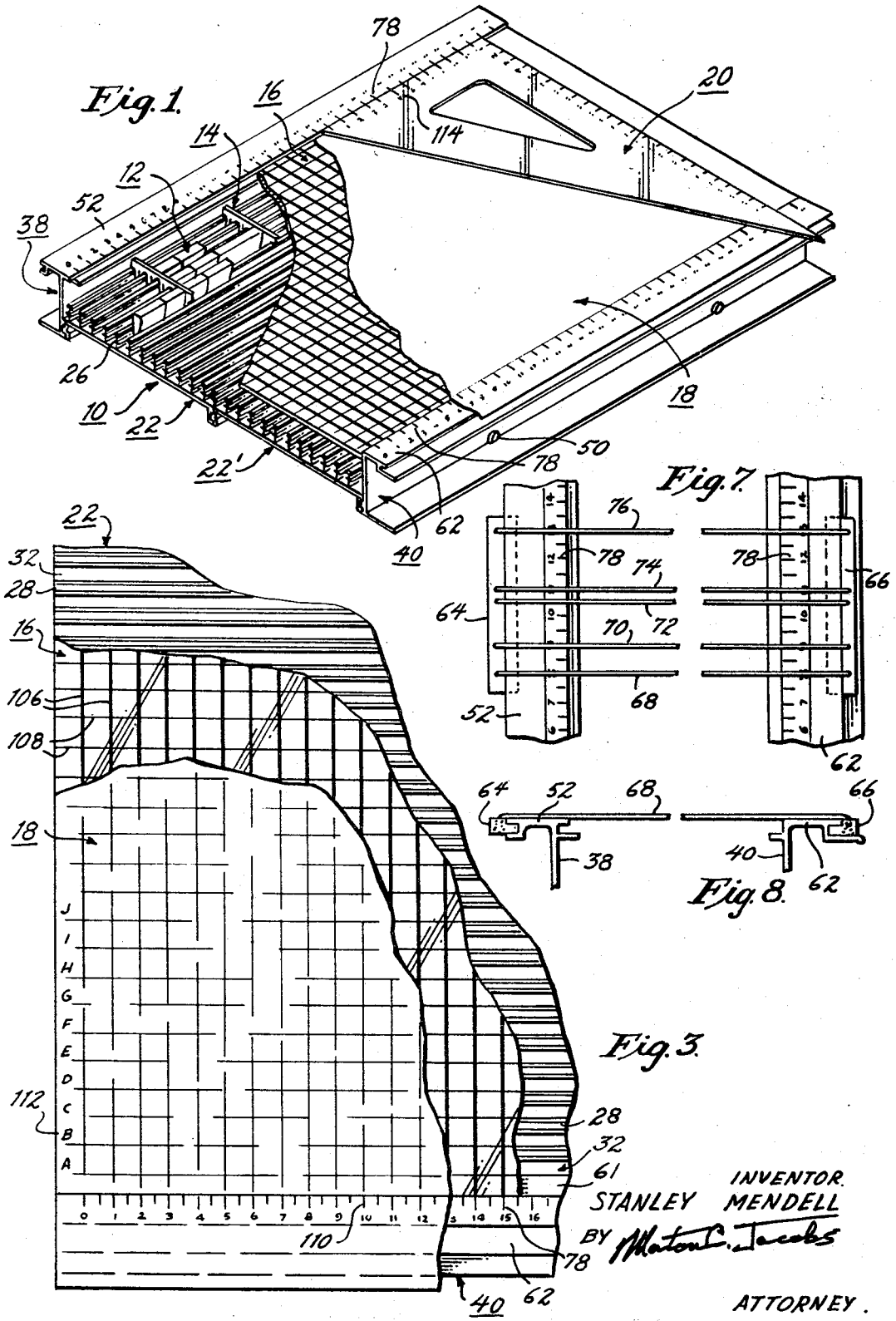

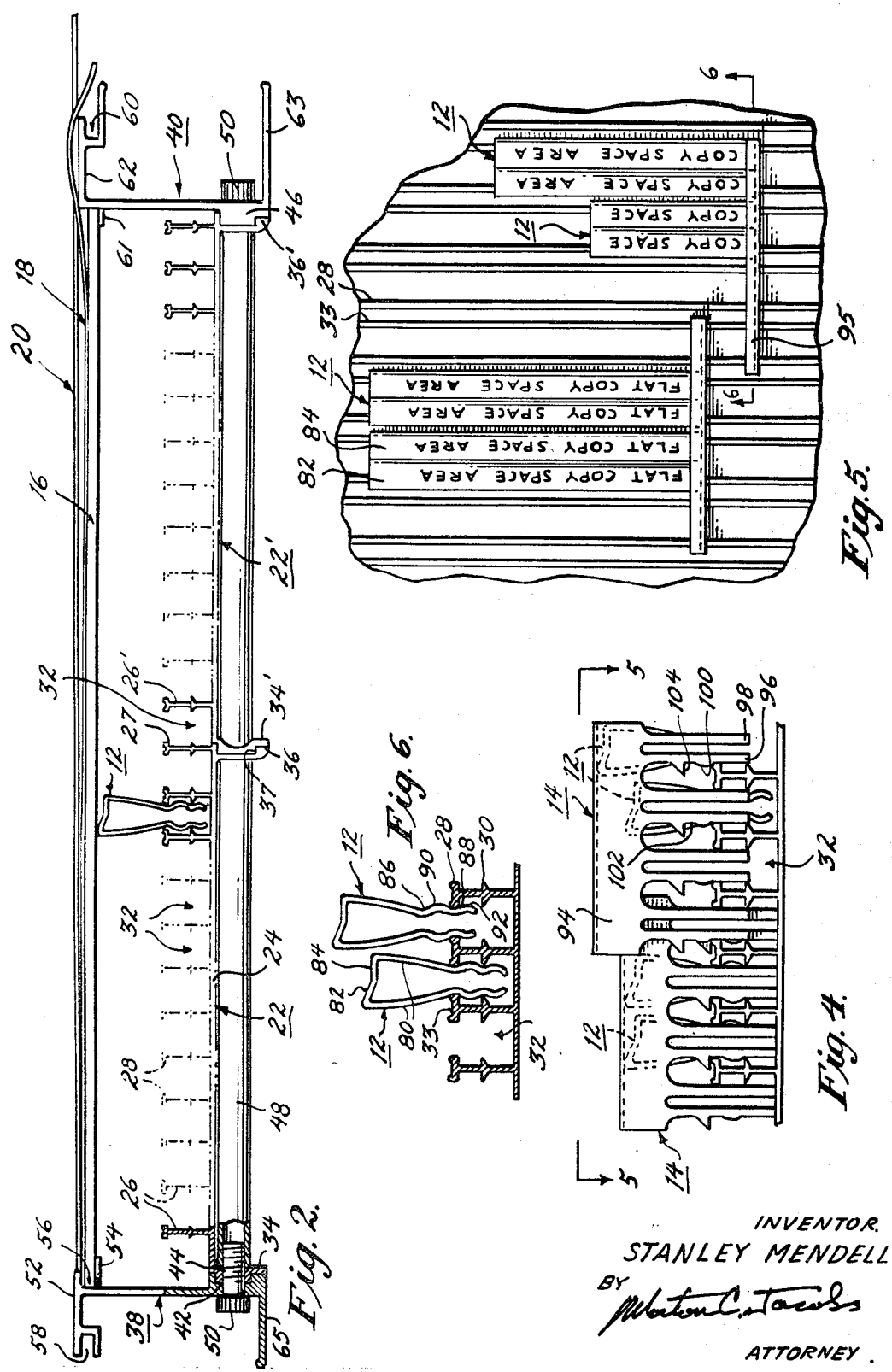

ABSTRACT OF THE DISCLOSURE

A graphical chart display device, for use in the critical path and PERT methods of planning analysis, employs a display board having a plurality of parallel channels and gauge elements which are slidable in the channels. The gauges are formed as spring elements having surfaces engaging with the channels at two levels of entry. At one level the gauges are freely slidable, and at the other they are substantially locked in place. Fences mounted transversely to the channels are also formed for different levels of insertion in the channels. A frame-of-reference system for the display board and gauges includes flanges for mounting a flat, transparent tracing support on the board over the gauges, and indexing devices for the board, the tracing support, and the gauge elements.

---

The present invention relates to a graphical chart display system, and more particularly to graphical chart devices and systems for display of and use in the planning, scheduling and managing of work and production programs, and to such devices and systems for displaying bar charts.

This invention is an improvement of the devices and systems described in applicant's patent, U.S. 3,124,885. It is particularly adapted for use with the mathematical and statistical analysis techniques known as the "Critical Path Method" and the "Program Evaluation and Review Technique" (PERT).

In the aforementioned patent, the graphical chart display devices include a board having a plurality of parallel channels, in which there are movably assembled a plurality of gauge elements whose lengths represent the time durations of the activities of a program. These gauge elements are positioned in various series and parallel relations that represent the interrelationships of the various activities. A plurality of fences are positioned across the parallel paths and provide junction indications of the gauges of the various networks. The fences may also be used to interrelate and couple the gauges of different networks whereby various adjustments and modifications of the networks can be achieved, as explained in the aforementioned patent.

Such a display device has been found useful as a manipulative tool with which to analyze and formulate complex work schedules and programs and to keep a running record of the schedule or program during its various stages of completion. These programs can become quite complex, involving hundreds or even thousands of individual activities that have to be properly related. It is often desirable, in connection with the analysis or recording of such a program, to develop chart records of the various alternative forms of the program, or of the various stages of the program as it is carried out. The task of drawing such a chart can be quite tedious and time-consuming where large numbers of activities are involved, and in transposing the program developed on the display board to a drawing it has been found that errors occur. In addition, it has been found desirable to be able to lock the gauges in position so that the display may be carried or placed in various orientations for display.

Accordingly, it is among the objects of this invention to provide a new and improved graphical chart display.

Another object is to provide a new and improved graphical chart display that is suitable for making accurate drawings with relative ease and convenience.

Another object is to provide a new and improved graphical chart display having readily adjustable elements that can be reliably retained in adjusted positions.

Another object is to provide a new and improved graphical chart display that is relatively simple in construction and operation, and relatively inexpensive to fabricate.

In accordance with an embodiment of this invention, the graphical chart display device includes a board having a plurality of spaced parallel ribs with channels formed therebetween. Gauge elements are assembled in series and parallel networks along the channels, and the beginning and ending of each network is represented by a fence that extends at right angles to the ribs and across a suitable number of channels. The lengths of the gauge elements are integral multiples of a certain unit length and represent time or other characteristics of the various activities. The gauge elements are fabricated so that they can assume either of two positions within the channels: In one position they are readily slidable along the channels, easily inserted and removed, and manipulated to assemble the program, and to analyze and modify it; in a second position the gauge elements are held relatively fixed in the locations determined by the operator, whereby a drawing of the positions of the gauge elements may be readily made.

In one form of this invention, the board is provided with side panel members for mounting a transparent drawing support member over the gauges that are assembled within the channels. This transparent member has a grid of parallel lines that extend at right angles to the channels when it is mounted on the board. The spacing of the grid lines corresponds to an indexing scale on the side panels and to a unit gauge length, which serves as a time or other parametric scale in the display. The fixed position of the gauges in the channels is such that the top faces of the gauges are juxtaposed against the undersurface of the grid member, in which surface the grid lines are formed. Thereby, parallax errors in the relation of the grid lines to the gauge surfaces are avoided.

The graphical display system also includes a transparent tracing sheet having scale lines corresponding in spacing to the grid lines spacing on the panels, so that it may be properly indexed thereto and itself carry the parametric scale. In addition, a straight-edge is provided having corresponding scales thereon for enabling the ruling of lines on the tracing sheet as viewed therethrough to the top surfaces of the gauges. With these facilities one is quickly enabled to provide an accurate reproduction on the scaled transparent tracing sheet of a complex series of networks.

In one embodiment of the invention, the gauges are formed as U-shaped elements with flat surfaces at the closed end of the gauge, and with its open end adapted to fit within the channels of the board. The sides of the channel ribs are formed with two cross-arms that engage two V-grooves on outer side arms of the gauge when it is in a lowered semi-locked position. The lower V-grooves in the gauge engage the upper cross-arms of the channel ribs when the gauge is in its upper adjustable position. The fences are formed of thin, flat stock and each includes a plurality of connected U-shaped elements, each element being positionable in an individual channel. One of the arms of each fence element has a flat stop which indexes the fence in its lowermost position, and an intermediate, yieldable stop which determines the upper fence position. The arms of each fence element are sufficiently flexible to permit movement between the lower and upper portions. Thereby, the gauges and fences may be readily removed from the board and inserted therein at either the adjustable or locked positions. In the adjustable positions, the entire complex of gauge and fence networks may be apropriately adjusted; in the locked positions, the gauges and fences are reliably retained in position for use with the grid member in making drawing tracings.

The foregoing and other objects of this invention, the various features thereof, as well as the invention itself, may be more fully understood from the following description when read together with the accompanying drawing, in which:

FIG. 1 is a perspective view of a graphical display system embodying this invention;

FIG. 2 is an end view, partly in section, of the system of FIG. 1;

FIG. 3 is a fragmentary plan view of various elements of the system of FIG. 1;

FIG. 4 is an enlarged fragmentary end view of fences and gauges in different positions;

FIG. 5 is a plan view corresponding to that along the line 5—5 of FIG. 4;

FIG. 6 is a sectional view along the line 6—6 of FIG. 5;

FIG. 7 is a fragmentary plan view of the board of FIG. 1, with a line device connected thereto; and FIG. 8 is an end view of the line device of FIG. 7.

In the drawing corresponding parts are referenced throughout by similar numerals.

The display system shown in the drawing, and particularly in FIG. 1, includes the following devices: A board 10, a plurality of gauges 12, a plurality of fences 14, a transparent grid member 16 movably mounted on the board 10, a transparent tracing sheet 18 mounted on the grid member, and a triangle 20.

The board 10 is assembled from one or more table sections 22 and 22', which are preferably identical in construction so that a board of any desired length or width may be assembled. The table section 22 is an integral member that is preferably formed of extruded aluminum and includes a flat table member 24 extending the width and length of the section and a plurality of parallel ribs 26 projecting upright therefrom and extending the full length thereof. Each rib 26 has an upper cross-arm 28 (FIG. 6) at the top thereof and a lower cross-arm 30 at an intermediate position, at approximately the mid-point of the height of the rib. The ribs are equi-spaced and form channels 32 therebetween; depressions 33 in the top surfaces thereof function as base lines for making drawings of the board and its contents. The first rib 26' of section 22' (FIG. 2) is spaced from the edge thereof by the width of a channel, and the last rib 27 of section 22 is positioned substantially at the edge thereof so that the assembly of the two sections in juxtaposition forms the predetermined channel spacing therebetween.

Depending from the table member 24 are two flanges 34 and 36 that run the length thereof, and section 22' has similar flanges 34' and 36'. The flange 36 has a rectangular groove 37 extending the full length, which receives in a mating, interlocking relation the corresponding rectangular rib projecting from flange 34'. Thereby, the long sides of sections 22 and 22' may be joined and the adjacent end ribs 27 and 26' thereof are properly positioned in parallel relation to form a channel 32 therebetween. The joining of sections 22 and 22' is completed by locking these sections together. For this purpose top and bottom rail members 38 and 40, respectively, are provided, the former of which has an interlocking flange portion 42 having a rectangular groove 44 engageable with the rib of the table flange 34, and the latter of which has a ribbed flange 46 which interlocks with the grooved flange 36' (or flange 36, if but a single table is so assembled). A pair of locking rods 48 pass through the flange portions 42, 34, 36, 34', 36' and 46, to hold the sections 22 and 22' together with the rails 38 and 40 in assembled relation. Thumb screws 50 bear at the outside of each rail 38 and 40, and are threaded onto the rods 48 to retain the parts in assembled position. With various lengths of rods 48 and of rails 38 and 40, any desired number of sections 22, 22' may be assembled in width and in length.

Laterally projecting across the top of rail 38 (FIG. 2) is flange 52 which extends the full length of the rail, and a second, similar flange 54 projecting inwardly which form a groove 56 therebetween. The flange 52 bifurcates at its outer end to form a groove 58. At the upper end of rail 40, a groove 60 is similarly formed by an outwardly-projecting, full-length flange 62 that is bifurcated at its outer end; and an inwardly projecting flange 61 forms a ledge that extends the full length of the rail 40 and is at the same level as that of flange 54, to receive the grid member 16 thereon. The outer end of flange 62 forming groove 60, together with flange 63 projecting from the lower end of rail 40, act as supporting legs for mounting the display board in a vertical orientation. Hook-receiving holes are provided in a flange 65 at the lower end of rail 38 for hanging the display board on a wall.

The grooves 58 and 60 receive runners 64 and 66, respectively (FIGS. 7 and 8), which are formed as rectangular members shaped to slide smoothly therein, and which have a plurality of holes formed therethrough for receiving in corresponding relation the ends of a plurality of parallel elastic strings 68, 70, 72, 74 and 76. The spacing between various pairs of these strings is related to parametric indexing scales employed throughout the display device; for example, the spacing between strings 72 and 74 corresponds to a unit length of gauge; between strings 68 and 70 to two units; between strings 74 and 76 to four units; and between strings 70 and 72 to three units. Scale lines 78 are formed on the top flanges 52 and 62 of rails 38 and 40 that are calibrated in multiples of the unit gauge length. These scales 78 provide a fixed frame of reference against which all other positional measurements are made. Thus, each of the strings 68–76 provides a straightedge for extending the scale lines 78 across the board and the mounted gauges, and each pair of strings can be used like calipers to measure various lengths on the board.

A plurality of gauges 12 are provided which have various lengths that are integral multiples of the scale unit of the system, and which are of various colors to identify different classes of activities. The gauge is formed as a loop spring and has a double prong 80 (FIG. 6) of inverted U-shaped cross-section. The top of the gauge is formed by its web portion which is constructed to have a pair of surfaces 82 and 84 that converge in a V-shaped cross-section. Preferably, the angles of the two web surfaces 82, 84 are different to afford different light reflections that are readily distinguishable for various angles of incident light. For example, surface 84 is generally horizontal, with the gauge in the upright position, and surface 82 is slightly canted therefrom. Each surface 82, 84 provides an area for inscribing various data and information identifying and describing the activity represented by the gauge. It has been found that extruded, high impact polystyrene is a suitable material for an inscribable and erasable surface and for the desired resilience.

The lower side portion of each prong 80 is corrugated to form two outside grooves 86 and 88, with an outwardly projecting curved surface 90 therebetween and an outwardly projecting curved surface 92 between the groove 88 and the end of the prong. These prong corrugations are bisymmetrical for each prong, and the prongs 80 are canted to diverge towards their closed ends. The gauges 12 are inserted between the ribs 26, and can assume either an upper or lower position therein (these two positions are shown in FIG. 6 for gauges in two adjacent channels). The gauges are inserted by slipping them down into the channels 32 so that, in the upper position, the upper cross-arms 28 of the ribs engage and ride in the lower grooves 88. The gauges operate in effect as a U-shaped spring; the dimensions are chosen so that a slight compression takes place as each gauge is slipped into the upper position. But the compression is relieved when cross-arms 28 ride in grooves 88, and the surfaces 92 hold the gauge upright as its slides adjustably along the channel.

In the lower position the gauges are pressed down further into the channels 32, and the surfaces 90 are cammed past the cross-arms 28 so that the latter ride in the upper grooves 86. In this position the lower cross-arms 30 of the ribs engage the grooves 88 and provide lateral stabilization of the gauge; thereby the gauges are held in substantially uniform vertical orientation. In the lower position, the spring compression of the gauge is increased due to the divergent cant of the prongs, whereby the cross-arms 28 that are engaged in the upper grooves 86 substantially lock the gauge in position and prevent accidental sliding of the gauges as well as possible movement when the board is tipped to any angle and during the carrying thereof.

The fences 14 are generally similar in construction, except for variations in length, and are formed of extremely thin metal stock such as stainless steel, in order that the thickness dimension is negligible relative to the parametric scale unit for the gauge length. For example, it has been found suitable to form the gauges of multiples of ¼ inch, and to form the fences 14 about ⅟₁₀₀ inch in thickness. Generally, not more than ten fences are inserted along any combination of series paths in a program, so that the cumulative thickness of the fences is substantially negligible relative to the scale unit and is readily accounted for in all measurements that are performed.

The fences consist of an upper web portion 94 having a narrow bent-over flange 95 (FIG. 5) at its upper edge for rigidity and to provide a clearly visible marker of the fence. Depending from the web 94 are a plurality of similar pairs of fingers 96 and 98 that are insertible in the channels 32; the number of finger pairs varies and depends upon the number of channels to be encompassed by a particular fence in the assembly of a program on the board. Each finger 98 is generally rectangular in shape and suitably rounded at its ends, and the outer one of its edges engages the cross-arms 28 and 30 of the board ribs 26. The other finger 96 has an outer edge formed with a complex surface; starting at its rounded bottom end, a curved stop 100 is formed at an intermediate portion thereof and connects via a divergently tapered straightedge 102 to a square stop 104. The spacing between the outer edges of each pair of fingers 96 and 98 is such that the fingers fit closely within the channel formed between adjacent cross-arms 28 and 30 and slide smoothly along those channels to maintain the fence at substantially a right-angle to the channels. When so inserted, the rounded stops 100 position the fence 14 in the upper position so that the flange 95 overlies the top surfaces of the adjacent gauges 12 when the latter are also in their upper, adjustable position. In this position adjustment of the fences and the gauges by sliding movement along the channels is performed smoothly.

By pressing the fence 14 downward, the curved stop 100 is cammed past the cross-arm 28, and the resilience of the thin fingers 96, 98 permits the fence to move down until the square stop 104 engages the top surface of the rib cross-arm 28. The tapered surface 102 provides a frictional engagement with the cross-arm 28 to substantially retain the fences against sliding movement, and the fences are locked in place with the cross-arm 28 held between the stops 100 and 104. In the locked position of the fence, the flange 95 overlies the top surfaces of the gauges 12 when the latter are in their lower, locked position.

The board is used in the manner described in the aforementioned patent. The various activities of the program to be displayed are represented by the gauges, with the length of the gauge corresponding to a characteristic such as the time duration of the activity. Activities that occur seriatim are displayed by setting up successive gauges in series in a channel, and the activities that are performed concurrently are displayed by gauges set up in parallel channels. A network of parallel groups of gauges is set up between two fences (FIG. 1), with the first fence indicating the starting point of the network and the second fence the ending point of the network. The longest series path between the fences represents a critical path for that network. A program is generally composed of a large number of such networks, which themselves are arranged in series and parallel combinations on the board. The critical path for the overall program may be readily seen when the program is fully assembled. In addition, the display board may be used to present other characteristic information of the program activities and for various operations such as analysis of the program, modification thereof, and updating and keeping track of a program that is being performed.

In the process of assembling the program on the board, the scale lines 78 on the rails 38 and 40 serve as a basic, fixed frame-of-reference for the positioning of the gauges. A zero-line across the board is established by the zero point on the scale, which in practice it has been found suitable to set back two scale units from the left-hand edge of the board (as viewed in FIG. 1). The first activity of a program is represented on the board by a first gauge in a channel with its left-hand edge at that starting line, which may be accurately referenced by the crossline 68 on the runners 64 and 66. This first gauge may be pressed down to its locked position, and a fixed frame-of-reference for the gauges of succeeding activities is then established. In addition, it has been found convenient to use a piece of soft plastic tubing, of length equal to the two scale units for the zero-line, and to press the plastic into the channel to provide a zero-reference back stop for the first gauge.

As the program networks are assembled on the board, the gauges and fences are generally inserted to their upper, adjustable positions, so that networks formed between fences may be readily adjusted as a unit, and various changes and modifications may be readily made and established as required. In assembling the program and modifying it, the board may be operated in a vertical orientation; the gauges in their adjustable position cannot fall out since their corrugated surfaces are effectively latched to the rib cross-arms, and the fingers of the fences, though loose within the channels 32 when in their adjustable position, are sufficiently long to be retained in position.

When the display program is completed, or is at some appropriate stage to be retained in fixed condition, the gauges and fences are depressed to the lower, locked condition. The board may then be moved, turned on edge or upside down, without disrupting the display.

The transparent grid member 16 (formed of a suitable plastic) is insertible when the gauges and fences are depressed to their locked positions; the member 16 is readily inserted by inserting one edge in the groove 56 and dropping the opposite edge on the ledge of flange 64. The grid lines 106 of member 16 extend at right angles across the channels, are accurately indexed to the reference scale 78 (since the grid member is slidable within the grooves), and directly overlie the top surfaces 82, 84 of the gauges 12. The grid lines are formed on the under surface of grid member 16 in order to obviate parallax errors. For convenience, the grid lines 106 are spaced two scale units and permit accurate referencing of any gauge or portion of a network to the frame-of-reference scales 78. A second set of grid lines 108 at right angles may be provided wherein it is found desirable to provide reference lines parallel to the channels. These lines are similarly spaced two scale units and line up with corresponding edges of the channel ribs, since the width of cross-arm 28 is chosen to be a scale unit, as is the spacing between adjacent cross-arms. The lines 108 are useful in making reproductions of a network and in presenting reference characters for the individual channels, but they are not used for scale measurements; it has been found that, for many purposes, they may be dispensed with, since the cross-arms 28 and depressions 33 furnish strong line markings of the channels.

The runners 64, 66 and the elastic strings 68–76 attached thereto are readily mounted on the rails 38 and 40 and removed therefrom; the elasticity of the strings and the close fit of the runners in the grooves 52–56 retain the unit in place on the board. This unit may be used on the board with the grid 16 in place or removed.

For making prints of the display program, various reproduction processes may be used. For example, the board 10 may be photographed with a camera (or any related copying device) mounted above the board or with the board turned upside down over such a camera. A preferred form of reproduction system that has been developed makes use of translucent tracing sheets 18 of plastic material; a suitable material is a thin tri-acetate sheet that is prestressed and tempered to remove stretch and distortion. The sheet 18 may be formed in various lengths corresponding to the different possible lengths of the board (that is, multiples of the unit table length) and of various widths each slightly larger than multiples of the unit width of the board 10. In mounting the tracing sheet 18 on the grid member 16, one edge is inserted in the groove 56 together with the grid; the groove's relative width is so chosen that it serves to clamp the sheet 18 firmly in position. The other end of the sheet lies loosely over the flange 62 of rail 40. Near the lower edge of the sheet 18, a scale 110 (FIG. 3) is provided that is substantially identical with the scale 78 on rail flange 62. The scale 110 is positioned offset from the lower edge of the sheet 18 so that it precisely overlies the scale 78 when the sheet is properly positioned on top of the grid and within the groove 56. Thereby, the tracing sheet 18 and its reference scale 110 are precisely referenced to the same scale 78 that in turn provides the frame of reference for the positioning of the gauges and fences at various points along the channels.

The task of copying on the tracing sheet the positions of the various gauges and fences assembled in fixed position on the board then becomes a relatively simple one, and it has been found that even a fairly complex program with many activities can be traced quickly, neatly, reliably and accurately in a relatively short period of time. No special technical knowledge or skill is required for this task since the gauge image presented to the tracer is similar to that shown in FIG. 5 with the superimposed grid lines 106 and 108; that is, all of the lines are rectangular and sharply defined so that the tracing may be performed by freehand, or if desired a straight edge of the triangle 20 may be employed. When the tracing is completed, it contains an accurate drawing representation of the program on the board, with all of the gauges and fences accurately referenced to the scale 110. In addition, a set of reference symbols 112 may be provided along one edge of the tracing sheet to identify each of the channels, and similar symbols may be inscribed in the channels along one edge of the board; thereby, whenever it may be desired the program can be readily reassembled on a board from the traced drawing. The triangle 20 has a scale 114 along one edge thereof which can be matched with the scale 78 on rail flange 52; thereby, the other edge of the triangle provides a straight edge that is in turn accurately referenced to the frame-of-reference scale 78. The completed drawing on the tracing sheet 18 preferably contains all of the data carried on the surfaces 82 and 84 of the gauges so that the final drawing is a complete and accurate record of the program developed on the board.

The drawing on tracing sheet 18 may then be used in various reproduction systems to obtain black and white prints; for example, it has been found that the diazo process is effective for obtaining full-size black line prints of the traced drawing. For the purpose of obtaining color reproductions, color photographs may be made with a camera of the board display directly, though it is generally prohibitively expensive. However, with the board and system of this invention, full-color reproductions of the same size as the board display can be made relatively inexpensively. A traced drawing is developed on a tracing sheet 18 in the manner described above, and the color information of the differently colored gauges (which represent different classes of activities) is carried along by a simple color marking (e.g., a code or symbol identification thereof) on the tracing in each gauge section. Thereafter, a suitable process is employed for producing color separations or stencils that are used in a silk-screen printing process. Various techniques (hand or photographic) are known in the art for developing a set of stencils for multi-color silk screen printing; see, for example, "Complete Book of Silk Screen Printing Production" by J. L. Biegeleisen, Dover, 1963, particularly chap. 3–5. The chart drawn on the tracing sheet 18 is readily employed with such techniques. A preferred system is that employing transparent films which are superimposed on the sheet 18 and from which masks for each individual color are cut with a stencil knife to prepare individual silk screen stencils for the different colors to be printed. Ruby films (e.g., Ruby Lith or Ulano film) are suitable for this purpose; such films are transparent and are made as an acetate or lacquer sandwich from which rectangular areas of one of the layers are cut out wherein the desired color is to be printed. That is, the gauge areas on sheet 18 (corresponding to gauge surfaces 82, 84) are viewed through the ruby film and simple rectangular areas of the film are cut out at the proper locations; the areas corresponding to the gauge surfaces 82, 84 are cut out or not depending on whether a color separation positive or negative is to be developed.

Where color gradation or mixing is desired, half-tone sheets are applied to the cut-out gauge areas and the resulting stencil reduces the amount of the particular color printed at that gauge area. Three color separations or stencils and one black line separation or stencil are made in this fashion, and employed in a four-color process. The stencils employed in the multi-color process are accurately placed in register, and the scale markings 110 on the tracing sheet 18 effectively function as registration markings for accurate registry of the series of stencils in the printing process. When the chart on sheet 18 was drawn, these scale markings 110 were registered with the frame-of-reference scale 78, to which the gauges 12 were in turn registered when they were assembled. Thereby, an accurate drawing on sheet 18 is obtained, and accurate color prints are reproduced. In this fashion full color prints of the drawing are provided that cost but a fraction of the cost of corresponding photographic prints. Preferably, a chart is traced on sheet 18 which is then repeatedly used to develop the individual color stencils; however, the masking operations may also be directly performed on the sheet 18 when it is mounted on grid member 16 without first tracing the chart. Thereby, the tracing operation is eliminated, but accurate registration is nevertheless assured by the frame-of-reference and tracing scales 78 and 110.

This invention may also be used for bar chart display; the construction and operation are the same, except that the fences 14 are not employed. This gauges are used in a conventional manner for representing the elements of such bar charts.

Thus, a new and improved graphical chart display system is provided that is suitable for making accurate drawings and printed reproductions of a three-dimensional display board, with relative ease and convenience. A display board and gauges and fences therefor are provided that are relatively simple in construction and operation but ensure reliable adjustment and modification of the graph being displayed. The board is specially adapted for making drawings of the displayed chart.

The present invention may be embodied in other specific forms without departing from the spirit or essential attributes thereof. For example, this invention may be applied to the various forms of gauges described in the aforementioned patent. In addition, certain minor modifications have been found desirable in commercial forms of the invention: in the fences, the fingers 98 have been formed to be shorter than fingers 96; that is, in the upper position, the lower end of each finger 98 terminates just below the upper cross-arms 28. Therefore, the above described embodiment of the invention is presented merely for illustrative purposes and not as a restriction on the scope of the invention.

What is claimed is:

1. A graphical chart display system comprising:
 display mounting means providing a plurality of parallel paths;
 a plurality of gauge elements of lengths representative of characteristics to be displayed and selectively positionable along said paths;
 said mounting means and said gauge elements having interengageable surfaces for positioning said gauge elements at different levels within said paths, and including means for preventing sliding movement of said gauge elements along said paths when at one of said levels and for enabling such sliding movement when at another level.

2. A graphical display system as recited in claim 1 and further comprising:
 tracing means including a flat, transparent support member, and means for removably mounting said support member over said gauge elements to be in substantial contact with the upper surfaces thereof when positioned at said one level.

3. A graphical display system as recited in claim 2, wherein said mounting and tracing means further comprise means for indexing said transparent support member in a predetermined relation to said paths and said gauge elements mounted therealong.

4. A graphical display system as recited in claim 3, wherein said indexing means includes grid lines formed on said support member, the spacing of said grid lines having a predetermined relationship to a certain unit length of said gauge elements.

5. A graphical display system as recited in claim 4, wherein said tracing means further includes a transparent tracing sheet having means for indexing said sheet in predetermined relation to said paths and to said gauge elements mounted therealong.

6. A graphical display system as recited in claim 3, wherein said indexing means further includes line means movable along said mounting means and across said paths.

7. A graphical display system as recited in claim 3, wherein said indexing means further includes scale means providing a frame of reference along said mounting means.

8. A graphical display system as recited in claim 1, wherein each of said gauge elements is formed as a U-shaped spring member, the open end of which is insertible at different levels in said paths.

9. A graphical display system as recited in claim 8, wherein said mounting means includes a board having a plurality of parallel ribs forming channels therebetween, and wherein said ribs and the sides of said gauge spring members have interengaging surfaces for positioning the gauges at different levels in said channels, and said interengaging surfaces produce greater spring tension in said gauge elements at a lower level.

10. A graphical chart display system as recited in claim 9, wherein said interengaging surfaces of said ribs include a plurality of spaced cross-arms on each of said ribs extending partly across said channels; and said interengaging surfaces of said gauge spring members include a plurality of spaced grooves on a side of each of said spring members for engaging with said cross-arms.

11. A graphical display system as recited in claim 8, wherein the gauge is an integral U-shaped spring made of polystyrene.

12. A graphical display system as recited in claim 1, wherein said display system is for displaying and analyzing the longest path and the interrelationships of a program involving a plurality of activities having series and parallel relationships, and further comprises a plurality of linear fence elements positionable at right angles to desired ones of the parallel paths to indicate in a transverse linear fashion the beginning and end of a plurality of series and parallel networks each generally composed of a plurality of gauge elements in a plurality of parallel paths, and with the fence elements of the networks forming the beginning fence elements of succeeding networks.

13. A graphical display system as recited in claim 12, wherein each fence element is formed as a connected plurality of pairs of resilient fingers positionable at different levels within said channels and having different frictional engagement with the channel ribs at each level.

14. A graphical chart display system comprising:
 mounting means providing a plurality of parallel paths;
 a plurality of gauge elements of lengths representative of characteristics to be displayed and selectively positionable in series along said paths and having upper surfaces extending above said paths at a certain level;
 and tracing means including a flat, transparent tracing support member having indexing means;
 said mounting means including means for mounting said tracing support member over said gauge element surfaces substantially in juxtaposition therewith, and means for indexing said indexing means of the transparent support member in a predetermined relation to said paths and said gauge elements mounted therealong.

15. A graphical chart display system as recited in claim 14, wherein said indexing means of the support member includes a set of parallel grid lines thereon.

16. A graphical chart display system as recited in claim 14, wherein said tracing means further comprises a transparent tracing sheet having means for indexing said sheet in a predetermined relation to said indexing means of the mounting means and in a predetermined relation to said paths and said gauge elements mounted therealong.

17. A graphical chart display system as recited in claim 14, for displaying and analyzing the longest path and the interrelationships of a program involving a plurality of activities having series and parallel relationships, said system further comprising:
 a plurality of means for adjustably grouping said gauge elements in series and parallel relationships, said group means including a plurality of linear fence elements positionable at right angles to desired ones of said paths and selectively to less than all thereof to indicate in a transverse linear fashion the beginning and end of each of a plurality of series and parallel networks each generally composed of a plurality of gauge elements in a plurality of parallel paths, and with the end fence elements of the networks forming the beginning fence elements of succeeding networks, said fence elements having upper surfaces extending above said paths at substantially the same level as that of said gauge surfaces.

References Cited

UNITED STATES PATENTS 3,162,174 12/1964 Whyte _____ 35—24.2 XR
3,290,797 12/1966 Opel _____ 35—24.2

EUGENE R. CAPOZIO, *Primary Examiner.*
WILLIAM H. GRIEB, *Assistant Examiner.*